No. 864,160. PATENTED AUG. 27, 1907.
W. FITZGERALD.
GRATE.
APPLICATION FILED JULY 18, 1906.
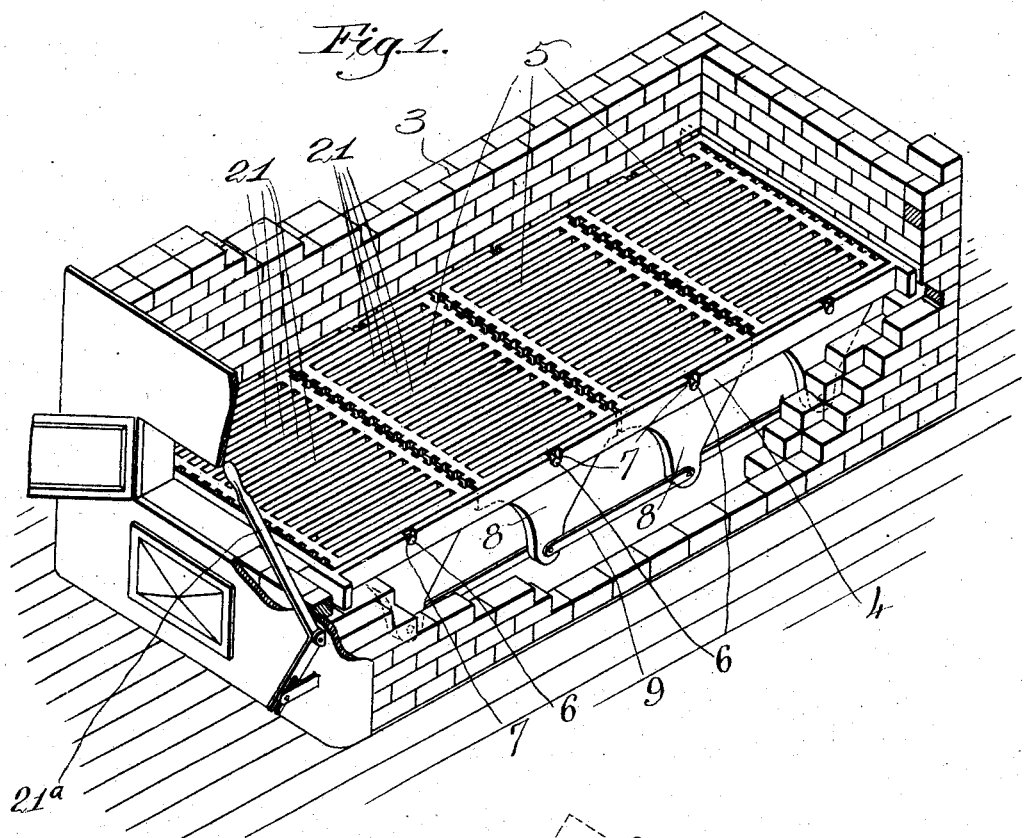
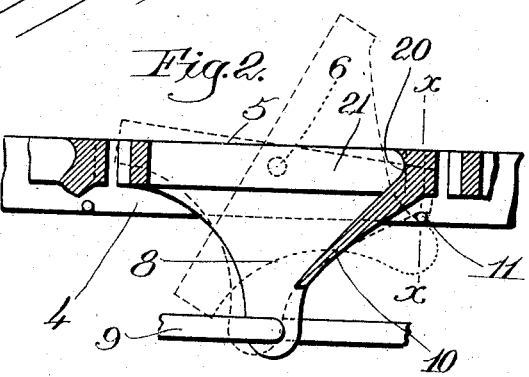
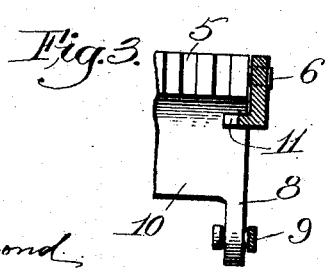
Witnesses.
Thomas J. Drummond
William Guay
Inventor.
William Fitzgerald,
by Crosby & Gregory attys.

UNITED STATES PATENT OFFICE.

WILLIAM FITZGERALD, OF EVERETT, MASSACHUSETTS.

GRATE.

No. 864,160.　　　Specification of Letters Patent.　　　Patented Aug. 27, 1907.

Application filed July 18, 1906. Serial No. 326,710.

*To all whom it may concern:*

Be it known that I, WILLIAM FITZGERALD, a citizen of the United States, and a resident of Everett, in the county of Middlesex and State of Massachusetts, have invented an Improvement in Grates, of which the following description, in connection with the accompanying drawing, is a specification, like letters on the drawing representing like parts.

This invention relates to grates for steam boilers, and is an improvement upon the device illustrated and described in my Patent No. 518,779, dated April 24, 1894. In said patent is illustrated a shaking and dumping grate comprising a plurality of pivoted grate bars, each having depending therefrom a deflecting wall which inclines rearwardly and upwardly to distribute the draft of air equally through the fuel bed. In said patent these grate bars are pivoted near one edge, and as a result when the grate bars are tilted for dumping the grate the entire weight of the grate bars has to be lifted.

In the present invention I have modified the form of grate bars by pivoting them centrally so that they may be dumped with a minimum expenditure of force. I have also provided a novel stop device against which they strike with a sharp impact as the grate is shaken whereby they are readily cleared from clinkers and ashes.

One embodiment of my invention will first be described and then the novel features thereof will be pointed out in the claims.

In the drawings, Figure 1 is a perspective view showing my improved grate bars; Fig. 2 is a vertical longitudinal section through a portion of the grate; and Fig. 3 is a section on line x—x, Fig. 2.

In the drawings, 3 designates the walls of the ash-pit and fire-box, and 4 designates the bars at the sides of the walls upon which my improved grate bars are hung. The grate bars are designated generally by 5, and each grate bar is provided at each end with a trunnion 6 which rests in a notch or socket 7 in the corresponding bar 4. Each grate bar has depending therefrom at each side an ear 8 connected to the link 9, and the link is connected to a suitable lever 21ᵃ for shaking or dumping the grate. This general type of a dumping grate is well known and its operation need not be further described.

In my improved grate bar the trunnions 6 are situated centrally thereof, and as a result when the grate is dumped, as shown in dotted lines Fig. 2, the front edge of the grate drops below the side bars 4, and the rear edge rises above the same. Since the grate bar is thus centrally pivoted it requires little power to shake or dump the same because the grate bar is substantially balanced on its trunnions. Depending from the back of the grate bar is the inclined deflecting plate 10 which extends from one end of the grate bar to the other.

The grate bar has a plurality of cross bars 21, and between each cross bar the grate has the upwardly and forwardly inclined surface 20 which merges into the front inclined face of the deflecting plate. This deflecting plate is for the purpose of deflecting the air as it enters the ash pit and causing it to be evenly distributed through the fuel bed. The upwardly and forwardly inclined surface 20 directs the air currents forwardly through the fuel bed and thus facilitates the consumption of the gas. In fact a grate having this feature takes the place of a smoke consumer because the air is so thoroughly distributed in the fuel bed that practically no smoke is produced.

Extending from each side bar adjacent each grate bar is a stop 11 against which the rear edge of the grate bar strikes when the grate is shaken, as shown in Fig. 2. This results in giving each grate bar a jar during each oscillation and this jar serves to facilitate greatly the clearing of the grate bar of ashes and clinkers. The stops also serve to limit the turning movement of the grate bars in one direction. Their principal object, however, is to give the grate bars the necessary jar to cause them to be quickly cleared of ashes and clinkers. The stops are so situated that when the grate bars are in their operative position they do not engage the stops but only when they are rocked during the shaking operation.

The two principal features of the invention are centrally pivoting the grate bars or extending the front edges thereof sufficiently beyond the trunnions so that the bar is balanced; providing the stop so that the grate bars are given a jar to clear them from ashes when they are shaken, and forming the upwardly and forwardly inclined surfaces between the bars 21 of the grate.

Various changes in the details of the arrangement may be employed without departing from the invention.

Having described my invention what I claim as new and desire to secure by Letters Patent is:—

1. In a grate, side bars, a plurality of grate bars each centrally pivoted on the side bars, an arm depending from each grate bar, and links connecting said arms, each grate bar having at its back edge a deflecting plate 10, the front face of which inclines upwardly and backwardly from the lower edge nearly to the top and then inclines upwardly and forwardly.

2. In a grate, side bars, a plurality of grate bars each centrally pivoted on the side bars, an arm depending from each grate bar, and links connecting said arms, each grate bar having the inclined deflecting face 10 at its back edge, the cross bars 21 and the upwardly and forwardly-inclined surface 20 between each cross bar which merges into the front face of the deflecting plate.

3. In a grate, side bars provided with stops and grate bars pivotally mounted on the side bars, said stops being located adjacent to but spaced from the rear of each grate bar whereby when said grate bars are shaken, they contact with the stops when rocked in the direction of them.

4. In a grate, side bars each having inwardly-directed stops, and grate bars pivoted to the side bars, one stop being located adjacent to but spaced from the rear edge of each grate bar whereby when the grate bars are shaken they contact with the stops when rocked toward the latter.

In testimony whereof, I have signed my name to this specification, in the presence of two subscribing witnesses.

WILLIAM FITZGERALD.

Witnesses:
GEO. W. GREGORY,
MARGARET A. DUNN.